United States Patent [19]

Stagg

[11] 4,337,649
[45] Jul. 6, 1982

[54] APPARATUS FOR DETERMINING END-PLAY IN A TORQUE CONVERTER

[76] Inventor: Karl Stagg, 6 Helen Pl., Clifton, N.J. 07011

[21] Appl. No.: 113,922

[22] Filed: Jan. 21, 1980

[51] Int. Cl.³ .......................................... G01M 17/00
[52] U.S. Cl. ........................................ 73/118; 73/168
[58] Field of Search ................................. 73/118, 168

[56] References Cited
U.S. PATENT DOCUMENTS 4,164,864  8/1979  Feller .................................. 73/118

*Primary Examiner*—James J. Gill
*Attorney, Agent, or Firm*—M. K. Silverman

[57] ABSTRACT

Apparatus for determining end-play in a torque converter without draining oil from the torque converter and also useful for measuring end-play of same unit at salvage yards. The apparatus comprises a spring operated plunger slidably arranged in a tubular casing; locking pins slidably attached to the casing; a pair of plunger operating handles to initiate motion of the plunger; a central rod inside the plunger extending through the pair of handles; and a measuring gauge having a central pin slidably extending in the direction of the central so that an upward movement of the central rod representing the end-play in the torque converter causes to push the pin upward which provides a reading on the gauge.

5 Claims, 7 Drawing Figures

APPARATUS FOR DETERMINING END-PLAY IN A TORQUE CONVERTER

BACKGROUND OF THE INVENTION

The present invention relates to an apparatus for checking an end-play in a torque converter used in automobiles. More particularly, the present invention relates to an apparatus for and method of checking the end-play in a torque converter without removing the oil from the torque converter.

Various patents in the prior art relate to similar measuring instruments. The prior art is represented by patents such as U.S. Pat. No. 2,826,062 (1958) to Brown et al; and U.S. Pat. No. 2,323,925 (1943) to Markwardt. Markwardt dislcoses devices for testing the hardness of materials, such as wood, plastics, and other non-metallic materials. The device includes a test head carrying a group of pins adapted to penetrate the material to be tested and means for determining the distance to which the pins penetrate the material under a given load.

Brown et al disclose an apparatus for indicating the plastic deformation occurring in a test specimen during application of load to the specimen. The use of electric strain gauges connected to the test length and to the elastic member, and the strain gauges connected in a bridge circuit are disclosed.

The torque converter end-play gauge as used in prior art is not capable of measuring the end-play without removing the torque converter in the car, and also without removing the oil from the torque converter. Further, to determine the end-play in torque converter at salvage yards is also not possible with the gauge as available today. Accordingly, it is necessary, in order to attain the most beneficial function, to attain a portable device that can determine the end-play in a torque converter accurately without facing aforesaid problems. This problem has, in the prior art, proven to be a formidable one. Accordingly, the present invention is intended as a solution to said problem.

SUMMARY OF THE INVENTION

An apparatus for determining end-play in a torque converter comprises a spring operated plunger slidably arranged in a tubular casing; locking pins slidably attached to the casing; a pair of plunger operating handles to initiate motion of the plunger; a central rod inside the plunger extending through the pair of handles; and a measuring gauge having a central pin slidably extending in the direction of the central rod so that an upward movement of the central rod representing the end-play in the torque converter causes to push the pin upward which provides a reading on the gauge.

It is an object of the present invention to provide an apparatus for and method of checking the end-play in a torque converter without removing the oil from the torque converter.

It is another object to provide an apparatus which will obviate the need of removing a torque converter unit from the car for measuring the end-play.

It is a further object to provide an apparatus which is simple, light-weight, efficient and easy to handle for measuring the end-play in a torque converter.

It is still a further object to provide an apparatus which is very useful to measure the end-play in a torque converter at salvage yards.

DETAILED DESCRIPTION OF THE INVENTION

Figure 1:
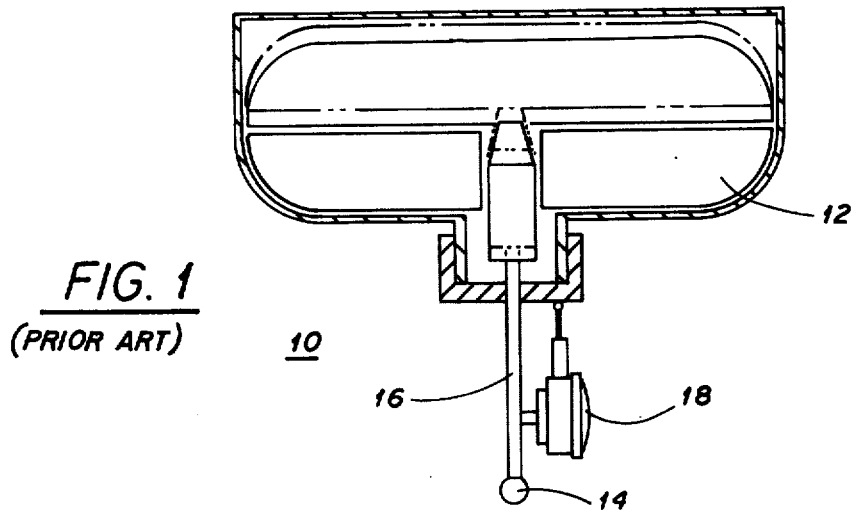
FIG. 1 is a front cross-sectional view of a prior art apparatus illustrating measurement of end-play in a torque converter unit.

A general understanding of the present invention may be obtained with reference to FIG. 1. In said figure is illustrated an apparatus 10 of the prior art for measuring the end-play in a torque converter unit 12. A torque converter unit 12 is an important element of a transmission system in any automobile. In order to measure the end-play in a torque converter it is required that it is removed completely from a car and then flushed out. A dial indicator 14 of an apparatus 10 is released and a rod 16 is pushed up until it touches the fins in the top. A gauge 18 is set to check the end-play in a torque converter 12.

Figure 2:
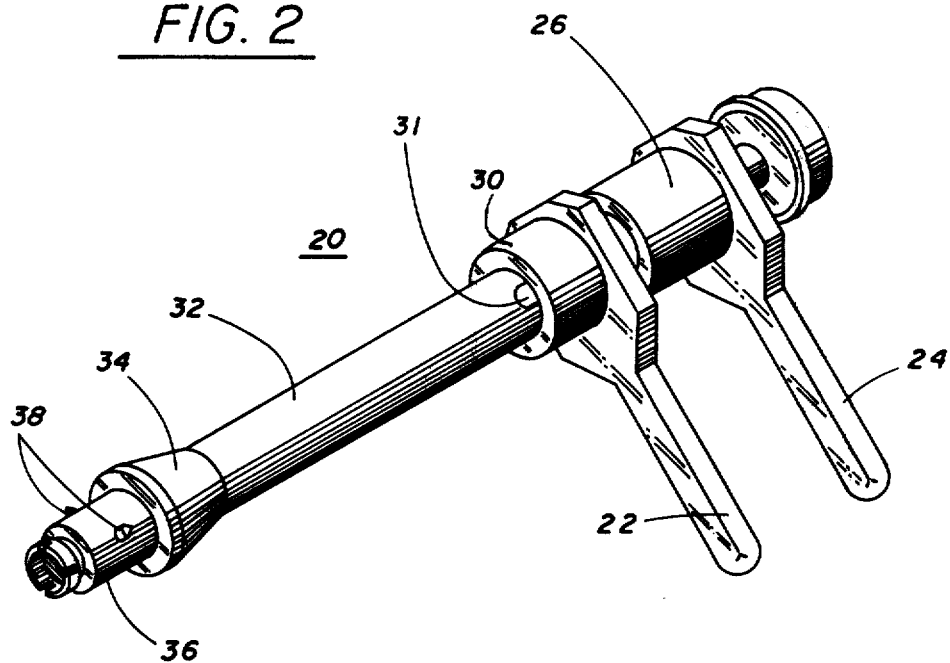
FIG. 2 is a front view of an apparatus of the present invention.

As shown in FIG. 2, an apparatus 20 of the present invention is provided with lower plunger operating housing handle 22 and an upper plunger operating housing handle 24. The handle 24 is attached with a cylindrical stationary housing 26. The housing 26 may also be an integrated part of the handle 24. The handle 22 is attached with a cylindrical slidably adjustable housing 30. The housing 30 may also be an integrated part of the handle 22. The housing 30 slides longitudinally in a groove 31 on a shaft 32 having tapered portion 34 at the end of the shaft 32. Thus, a travel of the housing 30 is limited to a predetermined distance. The tapered portion 34 is extended with a tubular casing 36 of a lesser diameter than a diameter of tapered portion 34 and substantially equivalent to same diameter of the shaft 32. The casing 36 is provided with a plurality of locking pins 38 vertically slidable to the casing 36.

Figure 3:
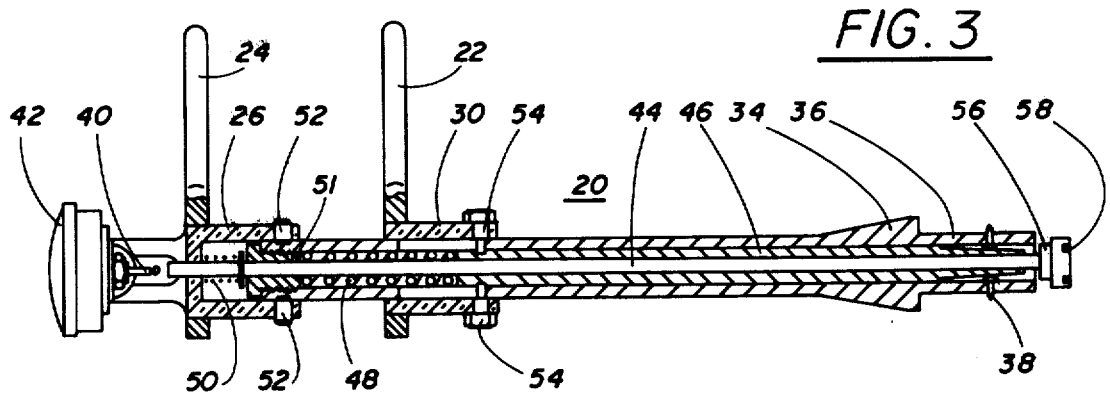
FIG. 3 is a front cross-sectional view of an apparatus of the present invention.
Figure 5:
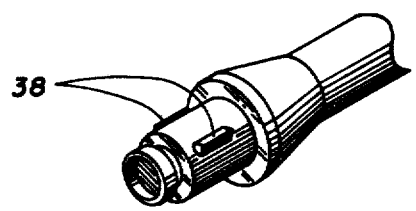
FIG. 5 is a partial front view of an apparatus showing a plunger operating feature of a second embodiment of the present invention.

A more detailed understanding of the novel apparatus 20 can be obtained with reference to FIG. 3. A central pin 40 attached to an adjustable measuring gauge 42 (dial type), is slidably extendable in the direction of a central rod 44 so that an upward movement of the central rod 44 representing the end-play in the torque-converter causes to push the pin 40 upward which provides a reading on the gauge 42. A plunger 46 slidably operated by a main plunger spring 48 is arranged centrally in the tubular casing 36. A plurality of locking pins 38, preferably three pins at equidistance from each other, engage the plunger 46 during its downward and upward motion. The locking pin 38 with respect to the tubular casing 36 is illustrated in FIG. 5. A indicating rod tension spring 50 is also provided in between the stationary housing 26 and a ring on plunger 46. Element 52 comprises three set screws which secure the cylindrical stationary handling housing 26 to the main body tubular casing 36. A pair of locking nuts 54 is provided on the opposite side of the slidable housing 30. A cap 56 is removably attached with the central rod 44 and the cap is provided with a plurality of oil relief grooves 58 so that oil in the torque converter 12 escapes through these grooves 58 and a true reading of the end-play in the torque converter unit is obtained.

Figure 4:
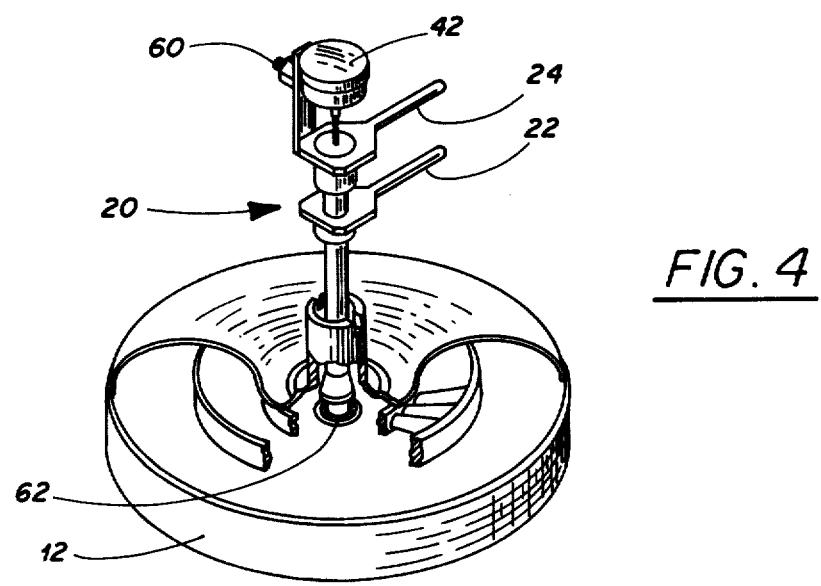
FIG. 4 is a breakway front view of an apparatus of the present invention.

As shown in FIG. 4, the dial gauge 42 is provided with a gauge adjusting means 60 attached to the stationary housing 26 to adjust the height of a hub at the bottom of the torque converter 12. The dial gauge is calibrated from 0 to 100 representing a thousandth of an inch which gives accurate measurement of an end-play in the torque converter unit 12.

Figure 7:
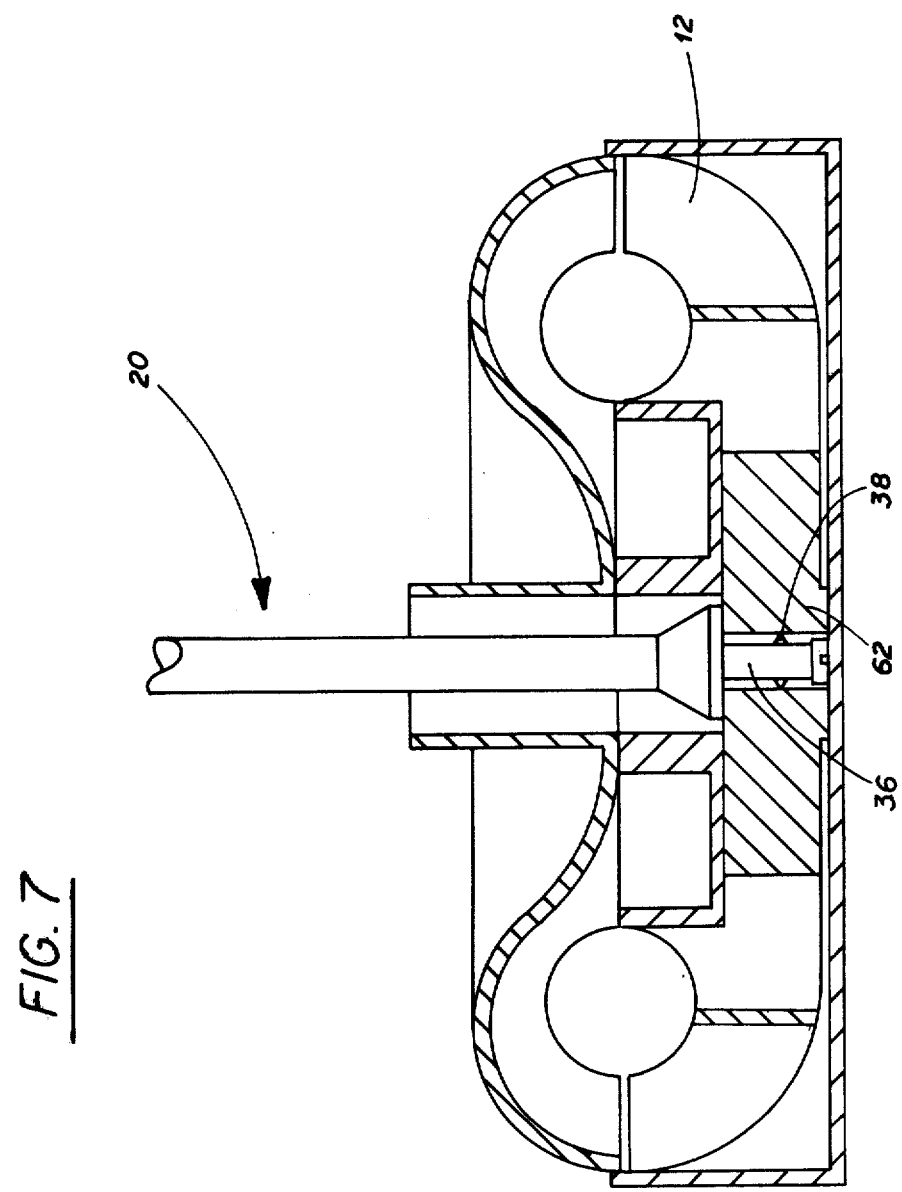
FIG. 7 is a partial enlarged front cross-sectional of an apparatus of the present invention illustrating measurement of end-play in a torque converter unit.

A method of measuring the end-play in the torque converter unit can be best understood with reference to FIGS. 4 and 7. The apparatus 20 is vertically held in the torque converter unit 12 so that locking pins 38 are in contact with a spline housing 62 of the torque converter unit 12. The lower plunger operating housing handle 22 is pulled upward with respect to the stationary housing handle 24 so that the plunger 46 pushes forward and releases the locking pins 38 and the central rod 44 inside the plunger 46 is pushed forward to get inserted at the bottom of the torque, i.e., in the spline housing 62. The handle 22 is released and thereby the pressure from the plunger 46 is released which in turn allows the locking pins 38 to extend outside longitudinally to engage the spline 62 of the torque converter unit 12. The dial 42 is adjusted at zero. The apparatus 20 is pulled upward and thereby reading a measurement of the end-play on the dial 42, which represents a travel of the central rod 44 in the torque converter unit 12. This method is very simple and avoids the prior art disadvantages as discussed hereinbefore.

Figure 6:
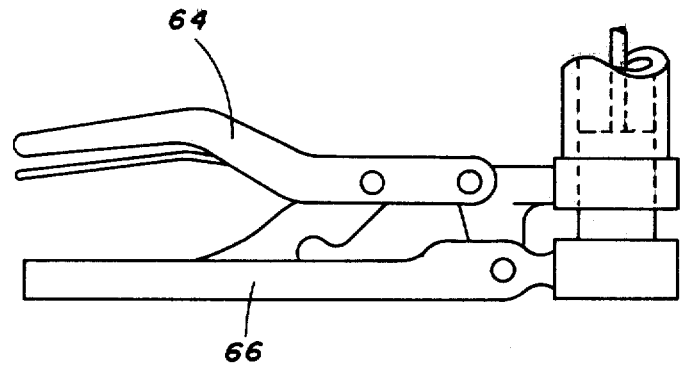
FIG. 6 is a front cross-sectional view of an apparatus of the present invention illustrating measurement of end-play in a torque converter unit.

As shown in FIG. 6, the pair of plunger operating handles 22 and 24 can be replaced with a spring operated handle 64 with respect to a stationary handle 66. This type of handle is usually used in a fire extinguisher device and it is able to function equally well as of the handles 22 and 24 as described hereinbefore.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. Apparatus for determining end-play in a torque converter, comprising:
(a) a tubular housing;
(b) a spring-operated plunger slidably arranged in said casing;
(c) a plurality of locking pins slidably attached to said casing, engaging said plunger during its downward motion and releasing said plunger during its upward motion;
(d) a pair of plunger-operating handles, one of which is attached to said spring-operated plunger and the other of which is attached to said casing, for moving said plunger;
(e) a central rod slidably disposed inside said plunger and extending exteriorly of said casing, said central rod including an integral ring, and a second spring between said casing and ring, said ring biasing the end of said central rod out of said casing; and
(f) an adjustable measuring gauge having a central pin slidably extending in the direction of said central rod so that an upward movement of said central rod representing the end-play of the torque converter causes said pin to push upward, thereby providing a reading of the end-play on said gauge.

2. The apparatus as recited in claim 1 further comprises a removably attached cap having a plurality of oil relief grooves, said cap is attached at the end of the central rod so that oil in the torque converter escapes through said grooves and a true reading of the end-play is obtained.

3. The apparatus as recited in claim 1 in which the tubular casing of the apparatus includes longitudinal grooves so that the travel of the plunger by the pair of plunger-operating handles is limited to a predetermined distance.

4. The apparatus as recited in claim 1 further comprising a gauge adjusting means for adjusting the axial position of the central pin relative to the bottom of the torque converter.

5. A method of determining end-play in a torque converter, which method comprises:
(a) pressing together a pair of plunger-operating handles so as to thereby release a plurality of locking pins into a retracted position;
(b) inserting a casing and a rod into a torque converter until said rod has reached the bottom of the torque converter and said casing abuts a part of the converter wherein a spring is compressed between the flange integrally communicating from said rod and its housing;
(c) releasing one of said handles in order to allow said pins to grip a spline housing of the converter;
(d) using said other handle to lift said casing as far as the end-play of the torque converter will permit while said spring maintains said rod in a pressure mode against the bottom of said converter; and
(e) observing a dial having a pin moved by said rod so that the dial indicates the extent of the relative motion, which motion comprises an indication of the end-play of the torque converter.

* * * * *